Patented Aug. 30, 1949

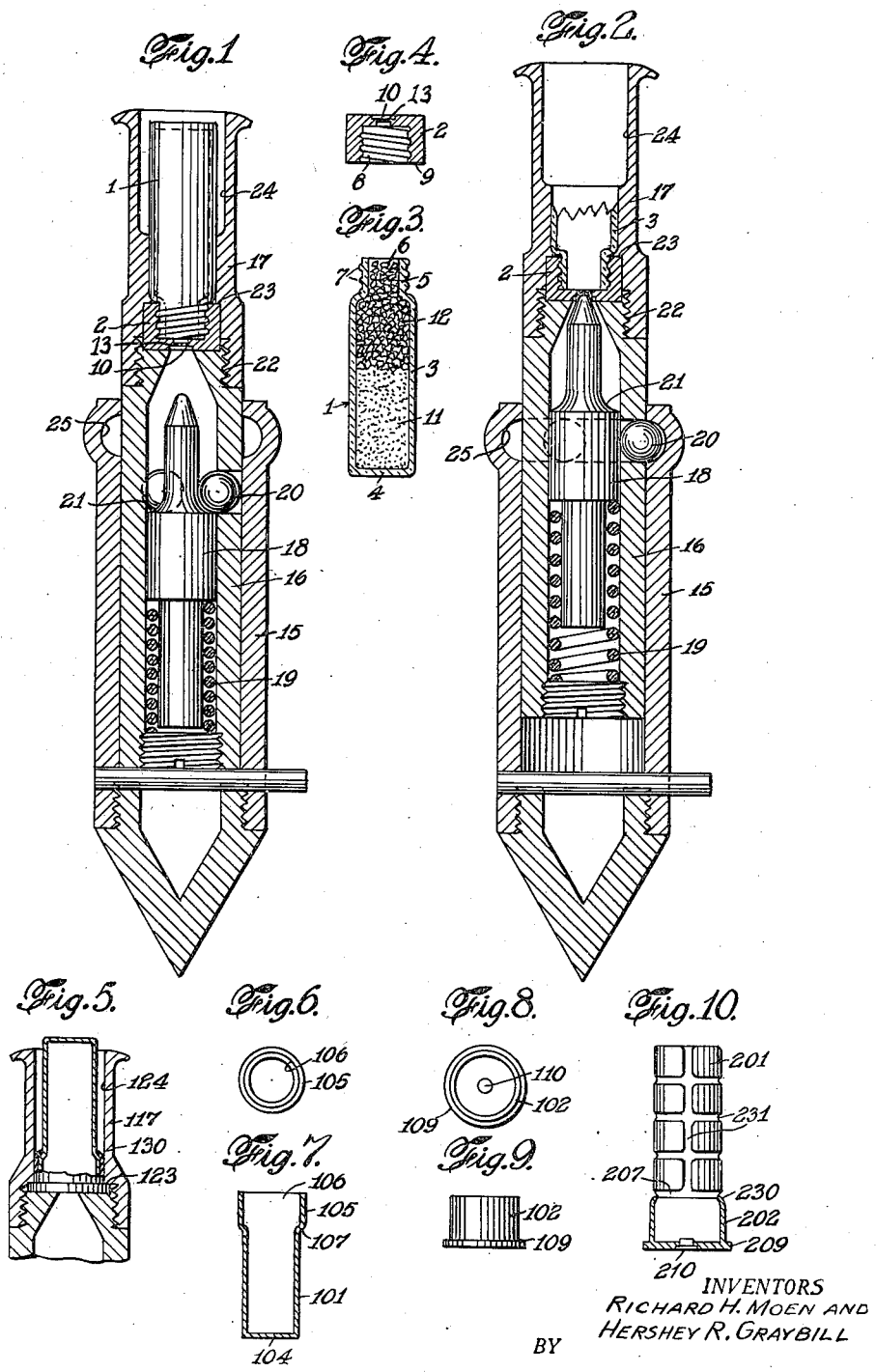

2,480,593

UNITED STATES PATENT OFFICE 2,480,593

CARTRIDGE FOR TRAP GUNS

Richard H. Moen, Millersville, and Hershey Roy Graybill, Manheim, Pa., assignors to Animal Trap Company of America, Lititz, Pa., a corporation of Pennsylvania Application August 11, 1944, Serial No. 548,956

5 Claims. (Cl. 102—39)

Our invention consists in the novel features hereinafter described, reference being had to the accompanying drawings which illustrate one embodiment of the same, selected by us for purposes of illustration, and the said invention is fully disclosed in the following description and claims.

The present invention relates to trap guns for destroying certain predatory animals, for example, coyotes and wolves, by explosively discharging poison or other chemicals into the mouth of an animal springing the trap, and particularly to cartridges for use in trap guns of this kind. These cartridges contain poison or other desired chemical and a propellent charge, and are provided with suitable percussion caps or other devices for detonating the explosive. The trap gun is provided with a chamber into which the cartridge is inserted, a pin for discharging the cartridge, and trigger mechanism for releasing the firing pin. In use, the trap is driven or buried in the ground with only a small part projecting to which the bait is attached. The bait holding portion is connected with the trigger mechanism in such manner that when the bait is seized by a coyote, wolf or other animal, the firing pin is released and discharges the cartridge in the cartridge chamber.

Trapping records indicate that although a fast acting poison, such as potassium cyanide is used, many carcasses are lost because the animals travel a considerable distance from the trap before collapsing. Moreover, it has been found that because of the trap being substantially buried in the ground where the cartridges are exposed to water and moisture for long periods of time, the explosive charge is deleteriously affected and the cartridge fails to explode when the trap is sprung. A further objection to cartridges heretofore available is that they have been relatively expensive so that their extensive use by the average trapper has been prohibitive.

It is an object of the present invention to provide a trap gun and an explosive cartridge for use therein which will act more quickly so as to decrease the time elapsing between discharge of the trap and the collapse of the animal springing it, thereby decreasing the distance an animal can travel if trying to escape after springing the trap. A further object of the invention is to deter an animal from running away immediately after discharge of the trap, so that the carcass will be found in the immediate vicinity of the trap. A further object of our invention is to enable a trapper to locate the carcasses of any animals that have not been killed outright and have run away from the trap after the explosion.

It is also an object of our invention to provide an explosive poison cartridge which is of simple construction and can be produced at low cost, is fully waterproof so that it can be immersed indefinitely without deleterious effects, and is of distinctive appearance so that it can be readily identified and will not be confused with other types of ammunition.

Other objects and advantages of our invention will be apparent from the following description and claims, in conjunction with the accompanying drawings which illustrate by way of example several embodiments of our invention.

In the drawings,

Fig. 1 is a longitudinal cross section of a trap gun in set position, and having an explosive cartridge therein.

Fig. 2 is a longitudinal cross section similar to Fig. 1, but showing the trap in sprung or fired position.

Figs. 3 and 4 are longitudinal cross sections of the shell or jacket and the base portion of a cartridge embodying our invention, prior to assembly of these parts.

Fig. 5 is a fragmentary longitudinal cross section similar to Fig. 1 and showing a modification.

Figs. 6 and 7 are a plan and longitudinal section, respectively, of the shell or jacket of the cartridge shown in Fig. 5.

Figs. 8 and 9 are a plan and elevation, respectively, of the base portion of the cartridge shown in Fig. 5.

Fig. 10 is an elevation of a cartridge illustrating a further modification in accordance with our invention, the base portion of the cartridge being shown in section.

The explosive cartridge, in accordance with our invention, comprises a container formed of frangible material, a base portion forming a closure for the container, a charge of explosive and poison sealed in the container by the base portion, and a detonator carried by the base portion for setting off the explosive charge. Upon discharge of the explosive cartridge when the trap is sprung, the poison is forcibly propelled into the mouth of the animal along with fragments of the frangible shell or jacket of the cartridge. The jacket is preferably made of material, such as glass, that breaks or shatters into sharp fragments or splinters which will pierce or lacerate the mouth tissues of the animal. The speed of assimilation of the poison is thereby materially increased, with the result that the animal will collapse more quickly. Moreover, the animal's efforts to get the glass or other sharp fragments out of its mouth may deter it from running away immediately after discharge of the cartridge, and it will hence collapse in the vicinity of the trap. Other materials, for example, materials having a distinctive taste or odor may also be included in the charge of the cartridge if desired, to further deter the inclination of the animal to run away from the trap. However, if despite these deterrents and the rapid assimilation of the poison the animal nevertheless succeeds in leaving the immediate vicinity of the trap, the bleeding resulting from the lacerations produced by the flying glass or other particles, will leave a trail so that the carcass can readily be located. By reason of the value of the pelt and the bounties paid by certain States on predatory animals, the location of the carcasses of the animals killed is of considerable importance.

In Fig. 1 of the drawings, an explosive cartridge 10 embodying our invention is shown in the cartridge chamber of a trap gun with which the cartridge is adapted to be used. The trap is shown in set or cocked position. The individual parts of the cartridge, comprising a shell or jacket 1 and a base portion 2, are shown separately in Figs. 3 and 4 as they would appear before assembly. The shell or jacket 1 which serves as a container for the charge of poison and an explosive is formed of glass, plastic, pottery, metal or any other material that will shatter into sharp or jagged fragments upon explosion of the cartridge. The container 1 is shown in tubular form with cylindrical side walls 3 and an integral end closure 4. The other end of the tube is provided with a neck portion 5 and an opening 6. It will be understood that the container 1 can be of any desired shape and that it can be molded or otherwise manufactured rapidly and inexpensively by automatic machinery.

The base portion 2 serves the dual function of forming a cap or closure for the container 1 and also a base for the cartridge. The base may be formed of any suitable material, such as metal or plastics, and is preferably non-frangible or shock-resistant, so that it will not break under impact of the firing pin or other device for firing the cartridge. The base is secured to the shell or container in any desired way that will provide a tight, permanent seal. In the embodiment shown in Figs. 3 and 4 the neck of the container is provided with threads 7 and the base portion is provided with corresponding threads 8, so that the base can be screwed onto the neck of the container to form a tight closure. As the exposed portion of the shell or jacket 1 is of one piece enclosed construction, a positive waterproof seal is provided without depending on any wads, waxes or the like. If desired a suitable gasket may be inserted between the base and the container. Alternatively, the cap or base 2 may be secured on the neck of the container 1 with a suitable cement or adhesive to provide a tight seal and to prevent subsequent removal of the cap. The base 2 provides means for holding the cartridge in the cartridge chamber of the trap gun. In the embodiment shown in Figs. 1, 3 and 4, the base portion 2 has an annular rim or shoulder 9 adapted to be engaged by a portion of the cartridge chamber, to hold the cartridge in position. Alternatively, the base of the cartridge and the trap gun can be provided with other interengaging means for holding the cartridge, such for example as interengaging screw threads or a bayonet type joint.

The base portion 2 is also provided with a detonator 10, for detonating the explosive charge of the cartridge. The term detonator is used in the specification and claims in a generic sense, to include a primer, percussion cap, or other device, or means to cause the firing of the explosive charge. In the embodiment shown in the drawings (Figs. 1 to 4) the detonator is illustrated as a primer of the type commonly used in shotgun shells. The primer is fitted into the center of the cap base, so as to be aligned with the firing pin or other discharge mechanism of the gun trap with which the explosive poison cartridge is to be used.

The charge of the cartridge comprises essentially an explosive, such as gunpowder and a fast acting poison, such as potassium cyanide. The cartridge may in addition include a chemical of distinctive flavor, taste or odor, which may be either agreeable or disagreeable to the animal, and will tend to deter the animal from running away from the trap after discharge of the cartridge. The materials comprising the charge of the cartridge may be either mixed or stratified for proper action or effectiveness, and if stratified may be separated by suitable wads or separators. For example, as shown in Fig. 3 of the drawings, the charge of poison 11 with or without other materials, may be placed in the bottom of the container, and the rest of the container may then be filled with a suitable explosive 12. It will be understood that in Fig. 3, the shell or jacket 1 of the cartridge is shown in inverted position, and that when the cartridge is in position in the trap (Fig. 1) the charge of explosive 12 will be in the bottom of the cartridge adjacent the detonator 10 of the base portion 2, while the charge of poison 11 will be in the upper portion of the cartridge. Alternatively, the poison and explosive may be loaded into the shell or jacket 1 of the cartridge in such manner that the explosive forms a central core surrounded by the poison, or the cartridge may be otherwise loaded to assure effective discharge of the poison and of the fragments of the frangible shell or jacket 1 into the mouth of the animal when the trap is sprung.

In the manufacture of cartridges in accordance with our invention, the shell or jacket 1, and the base portion 2, are formed, the base portion being provided with a detonator 10 as illustrated in Fig. 4. The charge, consisting of poison, explosive and any other materials desired, together with any necessary wads, fillers or separators, are loaded into the container 1, as illustrated in Fig. 3, and the base portion 2 is then screwed onto the neck of the container, thereby sealing the container. As the container 1 and the base portion 2 are both impervious to moisture, and as a moisture proof seal between the two members can readily be obtained, it will be seen that the charge of explosive and poison is effectively protected against moisture and that the cartridge will not be deleteriously affected even under the most adverse conditions of use.

The use of glass or other transparent frangible material for the shell or jacket of the cartridge has the further advantage that the contents of the cartridge are visible and hence open to inspection at all times. Moreover, a suitable coloring material may if desired be included in the charge to impart information to the user, as for example, to designate different kinds of cartridges, or different purposes or different animals for which the cartridges are intended. Alternatively, a slip of paper or other material may be used as a liner in the container 1 and may be suitably colored or bear symbols or characters to convey any information that is desired. Any such means of marking or identifying the cartridges or of transmitting information would of course be permanent as it is sealed inside the container. As the appearance of the cartridge described above is quite different from that of ordinary ammunition used in guns, there is virtually no possibility of confusion.

The cartridges in accordance with our invention, may be used in any suitable gun trap. In Fig. 1 of the drawings a cartridge embodying our invention is shown in loaded position in a gun trap similar to that shown and described in Lehn application filed on or about June 2, 1944, and given Serial No. 538,439. The gun trap illustrated comprises a socket portion 15, and a cylindrical retainer 16 provided at its upper end with a cartridge chamber 17. The cylindrical retainer 16 also contains a firing pin 18 actuated by a spring 19 and adapted to be held in the set or cocked position illustrated in Fig. 1 by detent members 20, which engage a shoulder 21 on the firing pin. The cartridge chamber 17 is removably attached to the retainer 16, for example by means of interengaging threads 22, and is provided with a shoulder 23 adapted to engage the rim or shoulder 9 of the base portion 2 of the cartridge to hold the cartridge in position in the chamber. The upper portion of the cartridge chamber 17 is of such diameter as indicated at 24 as to provide a space between the upper portion of the cartridge and the inner surface of the cartridge chamber.

It will be seen that the cartridge may be inserted in the cartridge chamber of the gun trap by removing the cartridge chamber 17, inserting the cartridge therein, and then screwing the cartridge chamber back onto the retainer 16 of the trap, so that the trap when loaded and set will be as shown in Fig. 1. A piece of meat, or other suitable bait, may be secured around or over the cartridge chamber to attract the animal, the trap having been pushed or driven into the ground, so that only the bait is visible. When an animal seizes the bait and pulls upwardly on it, the cartridge chamber 17 and retainer 16 slide upwardly in the socket 15, from the position shown in Fig. 1 to the position shown in Fig. 2. The detent members 20 holding the firing pin in cocked position are thereupon free to move outwardly into an annular recess 25 provided near the upper end of the socket 15, thereby releasing the firing pin 18, which is driven upwardly by its spring 19 and strikes the percussion cap or other detonator of the cartridge, thereby causing the cartridge to explode. The force of the explosion shatters the glass or other frangible shell or jacket 1 of the cartridge and propels the charge of poison along with the sharp fragments of the jacket into the mouth of the animal. The space between the lateral walls of the cartridge and the inner surface of the cartridge chamber, as illustrated in Fig. 1, permits radial as well as axial bursting of the shell or jacket of the cartridge, and the impact of the cartridge fragments after traversing this space, will break them up into still smaller fragments, so that a large number of small sharp fragments is provided. As stated above, these fragments will lacerate the mouth of the animal to cause more rapid assimilation of the poison, and at the same time to deter the animal from running away from the trap, by causing it to try to remove the sharp fragments of glass or other material from its mouth. Moreover, if the animal should run away, the bleeding caused by these lacerations will leave a trail so that the carcass of the animal may be found.

It will be understood that our invention is in no way limited to the particular embodiment that has been described and that many modifications and alterations are possible. For example, as shown in Figs. 5 to 9 of the drawings, where corresponding parts have been designated by the same reference numerals as in Figs. 1 to 4, with the addition of 100, the neck portion 105 of the container 101 may be provided with an annular shoulder 107 instead of being threaded. The cap or base portion 102 is adapted to slip over the neck portion 105 and is preferably formed of metal so that its edge can be crimped over the shoulder 107, as indicated at 130 in Fig. 5, to secure the cap or base member on the container 101. At its closed end the base portion 102 is provided with a rim or shoulder 109 adapted to be engaged by a shoulder 123 of the cartridge chamber 117 of the trap gun. By reason of the base of the cartridge being of larger outside diameter than the upper portion of the container 101, a space is provided between the lateral walls of the container and the inner surface of the cartridge chamber, as indicated at 124 in Fig. 5. This will permit lateral as well as axial bursting and fragmentation of the frangible container 101, as described above.

A slightly different embodiment of our invention is shown in Fig. 10, where corresponding parts are designated by the same reference numerals as in Figs. 1 to 4 with the addition of 200. In this embodiment the container 201 is provided near its open end with an annular groove 207 into which the upper edge of the base portion 202 is crimped, as indicated at 230. The container 201 is also provided with intersecting break lines indicated as grooves 231 to cause the container to break up into sharp fragments when the cartridge is discharged. The spacing and direction of the break lines 231 may be varied as desired. For example, instead of running circumferentially and longitudinally of the cartridge as shown, they may run helically in opposite directions, to provide diamond shaped fragments.

As a further means of waterproofing the cartridge, the cap or base portion can be formed or molded with a thin wall section between the primer and the explosive charge. For example, as illustrated in Fig. 4, the detonator 10 is set in a recess which extends only part way through the base, leaving a thin wall section 13 adjacent the recess. This thin wall, which will afford complete closure of the cap even if water should seep around the primer, will be shattered by the discharge of the primer and will not interfere with the action of the cartridge. Alternatively, the primer or detonator can be set into a recess formed on the inside of the base portion, leaving a thin wall portion between the primer and the outside of the cartridge.

Still other modifications of our invention are possible within the scope of the appended claims. Moreover, it will be understood that the various features of each of the embodiments described by way of example and illustrated in the drawings may be combined with features of the other embodiments, as desired. For example, the container 1 and 101 of the embodiment shown respectively in Figs. 1 to 4 and Figs. 5 to 9 may be provided with break lines, as illustrated in Fig. 10, and the embodiments shown respectively in Figs. 5 to 9 and Fig. 10 may employ gaskets or adhesives, or both, in sealing the base portion onto the container as described in conjunction with the embodiment shown in Figs. 1 to 4. The charge of poison and explosive in the cartridges shown in Figs. 5 to 10 may be the same as, or different from, the charge shown and described in conjunction with Figs. 1 to 4 of the drawings. It will be seen that when the base portion of the cartridge is permanently secured to the shell or jacket, for example, by the use of adhesive or by crimping the base over a shoulder of the jacket as shown in Figs. 5 and 7, the poison and explosive contents of the cartridge cannot be removed or tampered with in any way without breaking the frangible container.

What we claim and desire to secure by Letters Patent is:

1. An explosive cartridge, comprising a one piece tubular container formed of frangible material integrally closed at one end and having a screw threaded neck portion, a screw threaded closure for said neck, a charge of poison and explosive sealed in said container by said closure, and a detonator for said explosive carried by said closure, the frangible material being sufficiently brittle so that upon the shattering thereof, tissue cutting edges are formed on the fragments thereof.

2. An explosive cartridge, ocmprising a one piece tubular container formed of frangible material integrally closed at one end and having a neck portion, a closure for said neck, said closure and neck having interlocking portions for securing said closure in place to seal the container, a charge of explosive and poison sealed in said container by said closure, and a detonator for said explosive carried by said closure, the frangible material being sufficiently brittle so that upon the shattering thereof, tissue cutting edges are formed on the fragments thereof.

3. An explosive cartridge comprising a one piece tubular container of frangible material integrally closed at one end and open at the other, a closure of shock resisting material for sealing the open end of said container, said tubular container having a portion of smaller outside diameter than the maximum outside diameter of said closure, a charge of explosive and lethal poison sealed in said container by said closure, and a detonator for said explosive carried by said closure, the frangible material being sufficiently brittle so that upon the shattering thereof, tissue cutting edges are formed on the fragments thereof.

4. An explosive cartridge for a chemical gun trap comprising a container of frangible material, a charge of explosive and chemical in said container, an imperforate base portion sealing said charge in said container and having a recess extending partially through the wall of said base portion and providing a frangible thin wall portion adjacent said recess, and a detonator disposed in said recess.

5. An explosive cartridge for a chemical gun trap, comprising a one-piece tubular container formed of frangible material, integrally closed at one end and open at the other, a closure of shock resisting material for the open end of said container, means for securing said closure in place to seal the container, a charge of explosive and poison sealed in said container by said closure and a detonator for said explosive carried by said closure, said container being sufficiently frangible to burst upon detonation of said explosive.

RICHARD H. MOEN.
HERSHEY ROY GRAYBILL.

REFERENCES CITED

The following references are of record in the file of this patent:

UNITED STATES PATENTS

| Number | Name | Date |
|---|---|---|
| 34,798 | Wickersham | Mar. 25, 1862 |
| 1,526,351 | Lawrence | Feb. 17, 1925 |
| 2,072,914 | Wilder | Mar. 9, 1937 |
| 2,301,764 | Wainwright | Nov. 10, 1942 |
| 2,368,368 | Marlman | Jan. 30, 1945 |

FOREIGN PATENTS

| Number | Country | Date |
|---|---|---|
| 95,617 | Germany | Jan. 5, 1898 |
| 189,176 | Switzerland | May 1, 1937 |
| 826,553 | France | Jan. 8, 1938 |